United States Patent
Castle et al.

(10) Patent No.: US 11,093,724 B2
(45) Date of Patent: Aug. 17, 2021

(54) DEVICE AND METHOD FOR SCANNING THE PHYSICAL SIGNATURE DATA OF A PHYSICAL UNCLONABLE FUNCTION WITH A SMARTPHONE

(71) Applicant: Lexmark International, Inc., Lexington, KY (US)

(72) Inventors: Scott Richard Castle, Lexington, KY (US); Tristan Santos Dalay, Mandaue (PH); Robert Henry Muyskens, Lexington, KY (US); Neilson Gutay Navarrete, Mandaue (PH); Brant Dennis Nystrom, Lexington, KY (US); Thomas Eugene Pangburn, Winchester, KY (US); Samuel Leo Rhodus, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 16/811,438

(22) Filed: Mar. 6, 2020

(65) Prior Publication Data
US 2020/0304321 A1    Sep. 24, 2020

Related U.S. Application Data

(60) Provisional application No. 62/821,883, filed on Mar. 21, 2019.

(51) Int. Cl.
*G06K 7/14*    (2006.01)
*G06F 21/30*   (2013.01)
(Continued)

(52) U.S. Cl.
CPC .......... *G06K 7/1404* (2013.01); *G06F 21/30* (2013.01); *G06F 21/44* (2013.01); *G06F 21/73* (2013.01);
(Continued)

(58) Field of Classification Search
CPC ................... G06K 7/1404; G06K 1/12; G06K 2007/10524; G06F 21/44; G06F 21/73;
(Continued)

(56) References Cited

U.S. PATENT DOCUMENTS

2009/0218401 A1*  9/2009  Moran ................. G09F 3/10
                                              235/439
2012/0104097 A1*  5/2012  Moran ............. G06K 19/06037
                                              235/449
(Continued)

*Primary Examiner* — Daniel D Chang

(57) ABSTRACT

Unique physical unclonable function objects are created by molding pre-magnetized or post-magnetized particles into a resin. The particles form a unique physical "fingerprint" based on the random particle size, position, polar rotation, magnetization level, particle density, etc. This invention addresses devices for accurately measuring the physical fingerprint of a PUF, specifically including the X, Y, & Z components of the magnetic field at enough discrete points on the PUF to allow a confident recognition of the identification. A structural element to which a PUF tag is affixed is described that may be used to scan the PUF tag with a smartphone magnetometer by swiping the structural element along the side of the phone and controlling the position of the PUF tag with guides.

11 Claims, 11 Drawing Sheets

(51) Int. Cl.
  *G06F 21/44*   (2013.01)
  *G06F 21/73*   (2013.01)
  *H04L 9/08*    (2006.01)
  *H04L 9/32*    (2006.01)
  *G06K 1/12*    (2006.01)
  *G06K 7/10*    (2006.01)

(52) U.S. Cl.
  CPC .......... *H04L 9/0866* (2013.01); *H04L 9/3278* (2013.01); *G06K 1/12* (2013.01); *G06K 2007/10524* (2013.01); *H04L 2209/12* (2013.01)

(58) Field of Classification Search
  CPC ..... G06F 21/30; H04L 9/0866; H04L 9/3278; H04L 2209/12; H04L 63/0876; H04W 12/06
  See application file for complete search history.

(56) References Cited

U.S. PATENT DOCUMENTS

2017/0038807 A1* 2/2017 Bittlestone ............ H04L 9/3278
2019/0026724 A1* 1/2019 Wade .................... H04L 9/0866
2020/0412556 A1* 12/2020 Yoon ..................... H04L 9/3278

* cited by examiner

DEVICE AND METHOD FOR SCANNING THE PHYSICAL SIGNATURE DATA OF A PHYSICAL UNCLONABLE FUNCTION WITH A SMARTPHONE

CROSS REFERENCES TO RELATED APPLICATIONS

U.S. patent application Ser. No. 16/811,418, titled "A Handheld Wand Device and Method for Scanning the Physical Signature Data of a Physical Unclonable Function Along An Arbitrary Path."

PRIORITY CLAIM FROM PROVISIONAL APPLICATION

The present application is related to and claims priority under 35 U.S.C. 119(e) from U.S. provisional application No. 62/821,883, filed Mar. 21, 2019, titled "CryptoAnchor Scan Wand Swiped Along an Arbitrary Path," the content of which is hereby incorporated by reference herein in its entirety.

BACKGROUND

The present disclosure relates generally to devices for capturing physically measurable characteristic signatures along a line on the surface of a physical unclonable function objects created by molding specialized particles into a resin or matrix.

SUMMARY

Unique Physical Unclonable (PUF) function objects may be created by molding or extruding specialized particles creating a measurable physical characteristic over a surface. The PUF may be pre-magnetized or post-magnetized particles into a resin or matrix. The pre-magnetized particles form a unique measurable magnetic "fingerprint" based on the random size, position, polar rotation, magnetization level, particle density, etc., of the particles. PUF objects may also vary in other physical characteristics by having a mixture of magnetic, conductive (magnetic or nonmagnetic), optically reflective or shaped, varied densities or mechanical properties resulting in random reflection, diffusion, or absorption of acoustical energy particles in a matrix or binder. The present invention envisions sensing any of the characteristics in any singular or combination along an arbitrary line on the surface.

Described below are devices for accurately measuring the magnetic fingerprint of a PUF, including the X, Y, & Z components of the magnetic field at enough discrete points on the PUF to allow a confident recognition of the identification. The sensing devices may also measure any combination of additional sensing technologies including capacitive, optical (IR, visible, and hyperspectral) or acoustic (sonic and ultra-sonic). Each sensor may be discrete, combined adjacent to each other, or integrated in to one sensing module. While the present invention discusses a magnetic PUF and magnetic sensor or reader, it is to be understood that and of the said sensing technologies may be available in the wand or phone.

A handheld wand is described for measuring the PUF characteristics along an arbitrary path. The preferred measurement sensor is a magnetometer due to its low cost. Further, a structural element to which a PUF tag is affixed is described that may be used to scan a PUF tag with a smartphone magnetometer by swiping the structural element along the side of the phone and controlling the position of the PUF tag with guides. The structural element may be shaped in a way that encourages the user's finger to be placed on the touchscreen while holding the PUF tag in position on the edge of the smartphone. The touchscreen contact of the user when swiping the structural element may generate positional data.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
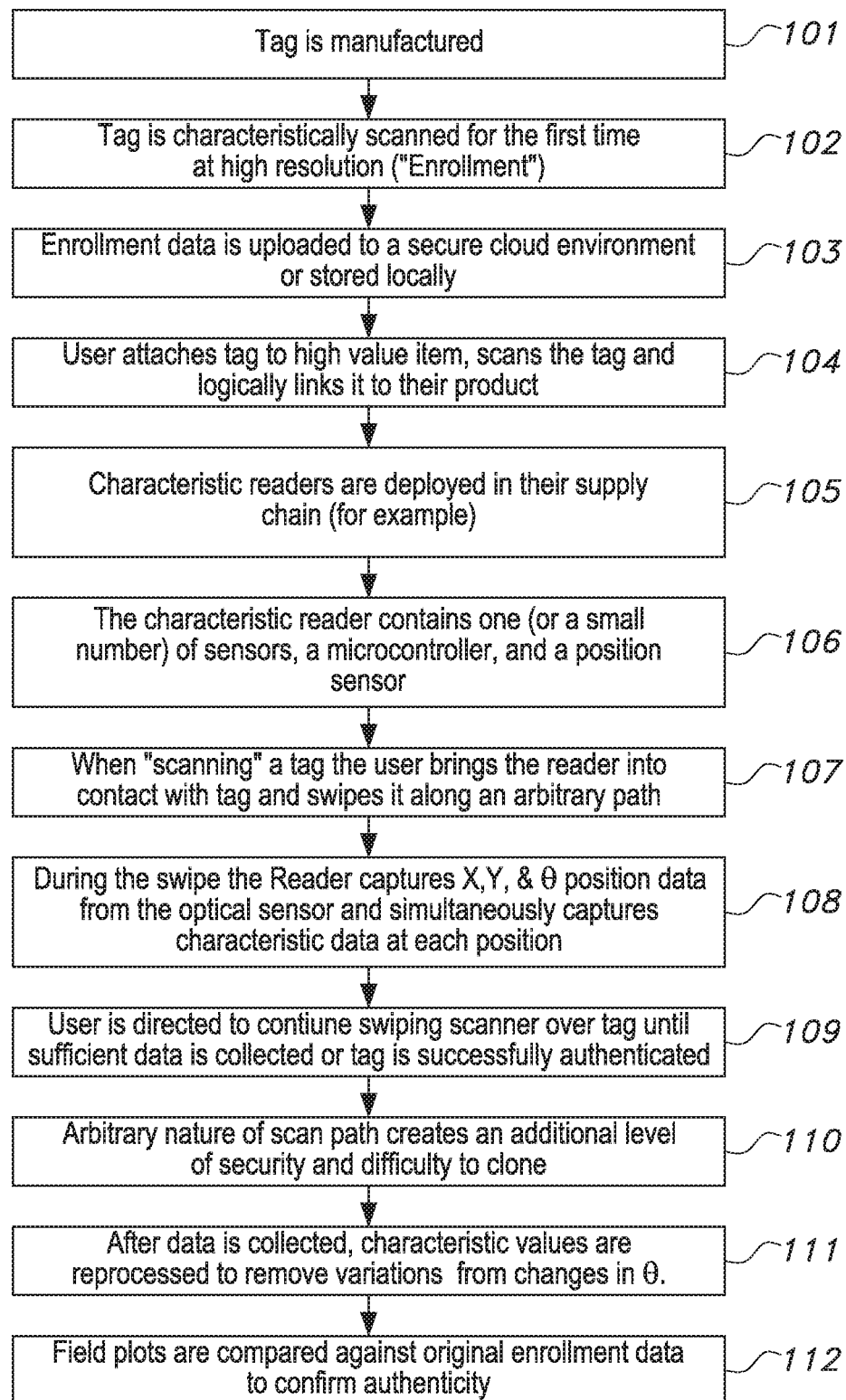
FIG. 1 is a logic flow chart for capturing the characteristic signature along an arbitrary path of a PUF using a scan wand.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having," and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top," "bottom," "front," "back," "rear," and "side," "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

Unique magnetic objects are created by molding pre-magnetized particles into a resin (nylon, etc.). The pre-magnetized particles form a unique magnetic "fingerprint" based on the random size, position, polar rotation, magnetization level, particle density, etc., of the particles. PUF objects may also vary in other physical characteristics by having a mixture of magnetic, conductive (magnetic or nonmagnetic), optically reflective or shaped, varied densities or mechanical properties resulting in random reflection, and/or diffusion or absorption of acoustical energy particles in a matrix or binder. The present invention envisions sensing any of these characteristics in any combination along a path. All of these PUF characteristics result in object's physical fingerprint that is a continuously varying in amplitude, direction, or depth over the observable surface. These variations are resolved into its directional or scaler components and stored for later verification.

A hardware reader capable of accurately measuring the physical characteristics of the fingerprint for a tag is required, however. The reader preferably measures the magnetic field of the X, Y, & Z components at enough unique points on a PUF to allow a confident recognition of the unique identification. Any one magnetic field component measured would satisfy the minimal system needed. The reader hardware may incorporate any combination or individual sensing units including magnetic as described here as well as optical (IR, visual or hyperspectral, focused or laser), capacitive or acoustic (sonic or ultrasonic).

Described below is an apparatus for capturing the magnetic and other signature characteristics along an arbitrary path of a PUF. Referring now to the drawings and particularly to FIG. 1, there is shown a logic flow chart of one sample embodiment.

At 101, a PUF tag is manufactured, and then at 102, scanned for its physical characteristics of interest at high resolution to enroll the PUF tag fingerprint information in a data base. The scan may include magnetic, optical (IR, visual or hyperspectral, focused or laser), capacitive or acoustic (sonic or ultrasonic) information over the surface. For this purpose, at 103, the information is uploaded to a secure cloud environment for later access. The data base is not limited to a cloud environment for 103, however, and a server or other local or remote resource may be used as well. The enrolled data may be encrypted or directly stored in a remote cloud environment or locally depending on the level of security needed. Visual storage may include a barcode, Quick Response (QR) code or field pattern image associated with the object. The visual pattern or picture can be printed or displayed on the object or any location that represents easy access. Local storage may also include electronics using an RFID (UHF, HF or LF) or direct connected wire device like USB or credit card integrated circuit or Bluetooth device for example.

At 104, a user attaches the PUF tag to an item, and scans the PUF tag to logically link the characteristic fingerprint of the PUF tag to a product. The attachment method may include using an adhesive, over molding, or injection into an existing part for example. At 105, a downstream user in the chain of commerce may use the reader device that is deployed in the supply chain to identify and authenticate a given product.

Figure 2:
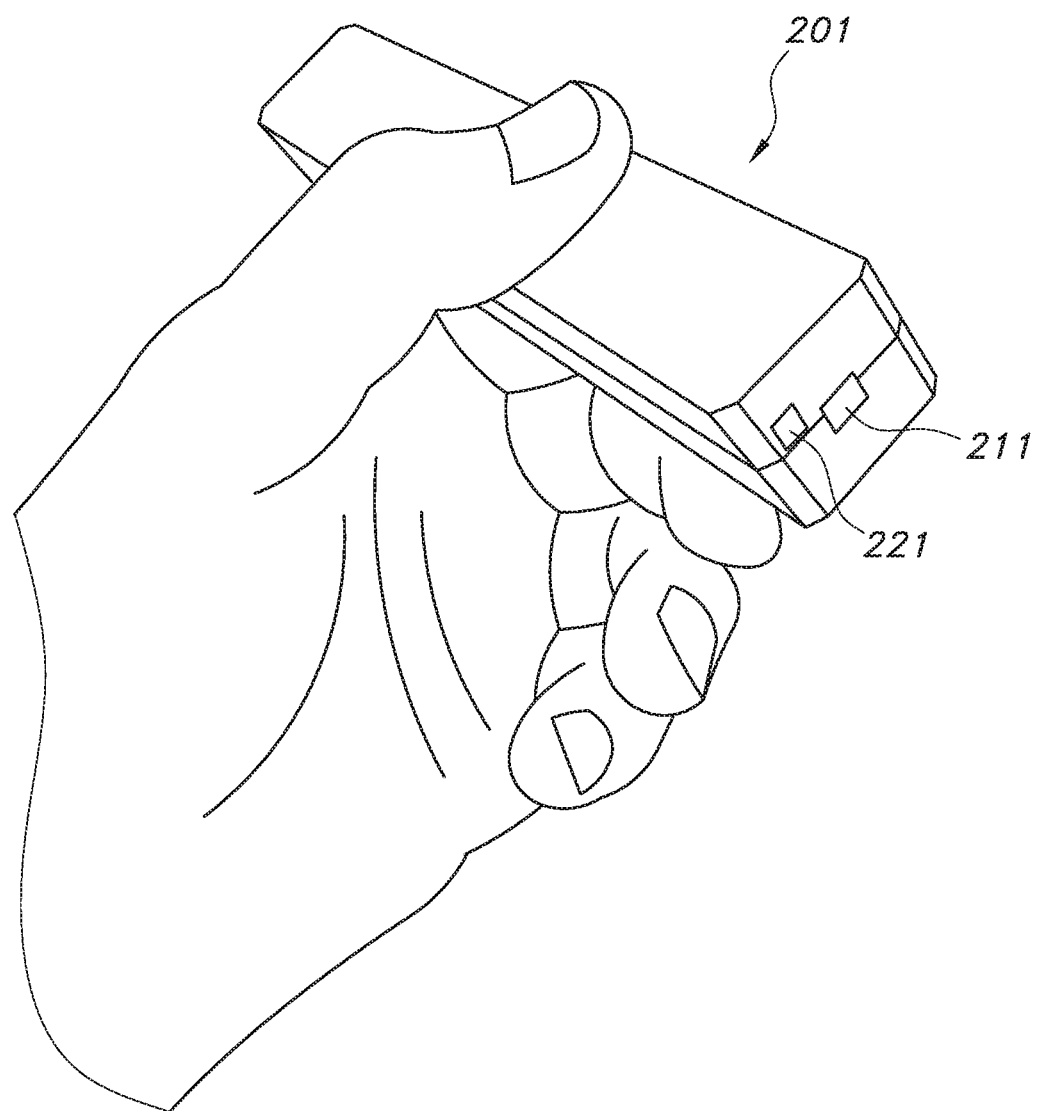
FIG. 2 is a perspective view of a scan wand.

At 106, the reader 201, see FIG. 2, containing one or more magnetic, optical (IR, visual or hyperspectral, focused, or laser), capacitive or acoustic (sonic or ultrasonic) sensors 211 on the tip of a wand-type handheld device is used to scan or read the characteristic fingerprint of the PUF tag on the product. On the tip of the wand, placed close to the characteristic sensor 211, is position tracking device 221 that may be an optical sensor similar to what is found in a computer laser mouse or an Inertial Measuring Unit (IMU). The optical position tracking device 221 takes high frequency image captures of the surface and computes a change in X, Y, and $\theta$ (rotation) between each image captured in order to determine positional movement. Other position location may be substituted that include touch pad, positioning arms (Coordinate Measuring Machine "CMM") or time of flight sonic or radio frequency techniques for example. This device is capable of either communicating the reader characters and position data to a mobile or remote device for processing, or performing the calculations on an internal microprocessor (not shown) and providing feedback to the user by, for example, a user interface ("UI"), light emitting diode ("LED"), or vibration/haptic feedback.

Figure 3:
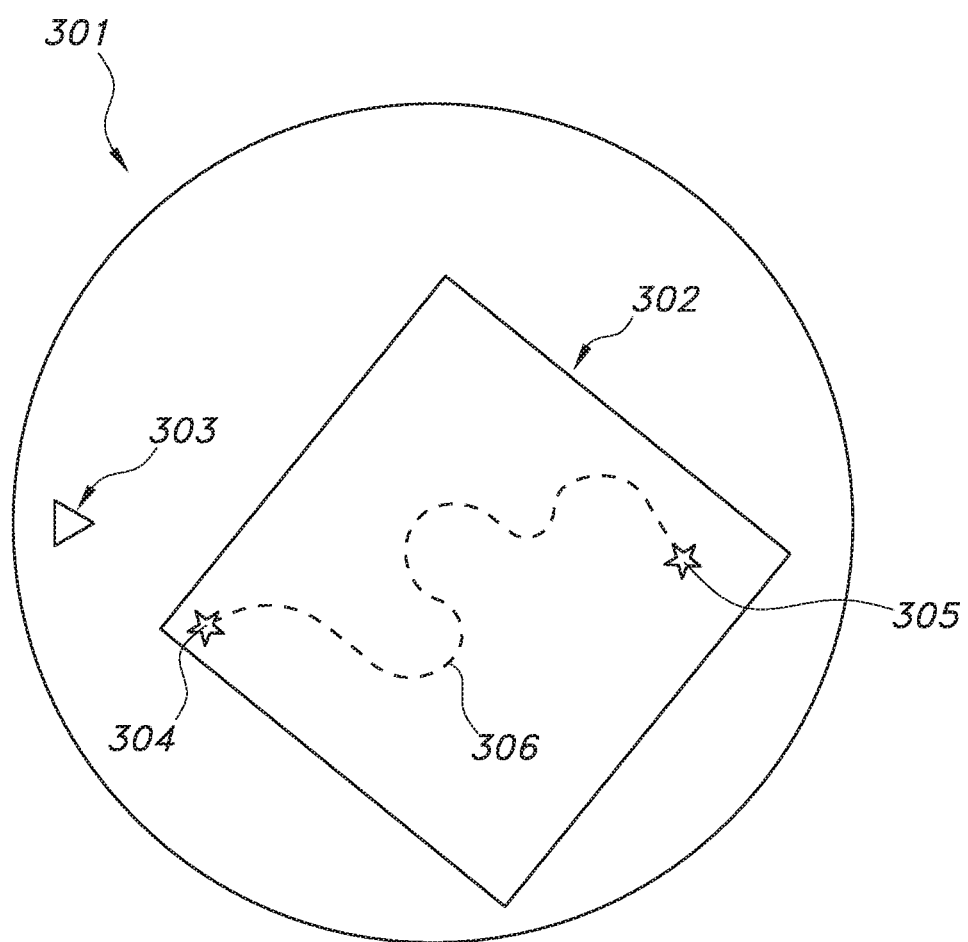
FIG. 3 is an arbitrary path for scanning the characteristic fingerprint of a PUF.

At 107, the user scans the tag by bringing the wand in contact, or near-contact with the PUF tag and swiping along an arbitrary path 304 as shown further in FIG. 3. In FIG. 3, the PUF tag 302 may be part of, or attached to, a larger element 301. The arbitrary path 304 may begin at an arbitrary start point 304 and finish at an arbitrary stop point 305. A reference fiducial point 303 may also be included. Due to the arbitrary nature of the potential swipe paths, a cloned tag would need to successfully reproduce all characteristic structures for the entire tag surface and not just a known path. Thus an arbitrary scan path complicates efforts to clone the PUF tag. Most of the sensing techniques require close proximity between the sensors and the PUF tag. An additional feature is to have the sensing devices on a system that allows rotation and alignment to the PUF surface. A spring or universal alinement swivel (not shown) would assist with the ergonomics of aligning to the surface.

However, the added level of security afforded by an arbitrary scan path comes at an expense in that it may become more difficult or time-consuming processing task to "recognize" the characteristic path of data against the known enrollment fingerprint.

In order to minimize the more difficult task of recognizing an arbitrary path, sensible fiducials 303 may be inserted within the tag. In its simplest form, these could be voids or holes where no particles exist within a specific region of the tag. A user would be directed to continue swiping in a variety of paths until a certain number of fiducials had been encountered. Such a forced swipe through fiducials, enables a tag recognition processing algorithm to quickly set key data points and filter the potential tags with fiducials in the right location(s).

At 108, during the swiping, the wand 201 captures positional data and characteristic data at discrete positions along the arbitrary path 306.

At 109, in the event that a user quickly encounters a variety of highly recognizable characteristic data and/or characteristic fiducials, the user may be notified that the scan is complete (by, for example, UI, LED, or vibration/haptic feedback). If a user does not encounter highly discernable characteristic structures the user may be instructed to continue swiping until enough data has been found, or a confident characteristic fingerprint match has been detected. The random nature of the variable quantity of characteristic data captured depends on the arbitrary path, which creates additional security and increases the cloning difficulty 110.

At 111, the characteristic components are reprocessed to remove variations from rotation of the wand. The characteristic and optical positional sensors trace slightly different paths depending on the relative position of the sensors. Since an objective is to match or recognize the characteristic fingerprint, when characteristic data is captured, the expected position and rotation of the sensor based on the optical sensor data may be assessed.

The rotation of the characteristic sensor at any given point introduces a secondary data processing step. The actual characteristic fingerprint data can be resolved into 3-dimensional vector components (BX, BY, & BZ) or scaler data. If the characteristic sensor is held precisely above a specific X, Y coordinate of the tag and then rotated about a theoretical Z-axis, the sensor values of BX, BY, and BZ for magnetic will change but will not for scaler data. This change is predicted mathematically as long as the rotation angle is known, which is measured by the optical sensor. Thus, for each magnetic data capture sequence the computed X, Y position of the magnetic sensor is recorded, and also the computed BX, BY, & BZ elements of the magnetic field based on the known rotation of the magnetic sensor.

At 112, the characteristic fingerprint are compared to the original enrollment data to confirm authenticity.

In a second embodiment, a magnetic PUF tag is scanned using a smartphone's magnetometer and screen for positional control. As described above, unique objects are created by molding pre-magnetized particles into a resin (nylon, etc.). The pre-magnetized particles form a unique magnetic "fingerprint" based on the random size, position, polar rotation, magnetization level, particle density, etc., of the particles. Described here are elements which enable a commonly available mobile device, such as a smartphone, to be used as the handheld reader for a PUF tag. These elements include: smartphone specific user instructions for magnetometer scan path; user interface elements; mechanical location control of a tag in relation to smartphone's magnetic sensor; single or multiple capacitive touch points; device dependent data amplification or filtering to compensate for variations in mobile device.

Figure 4:
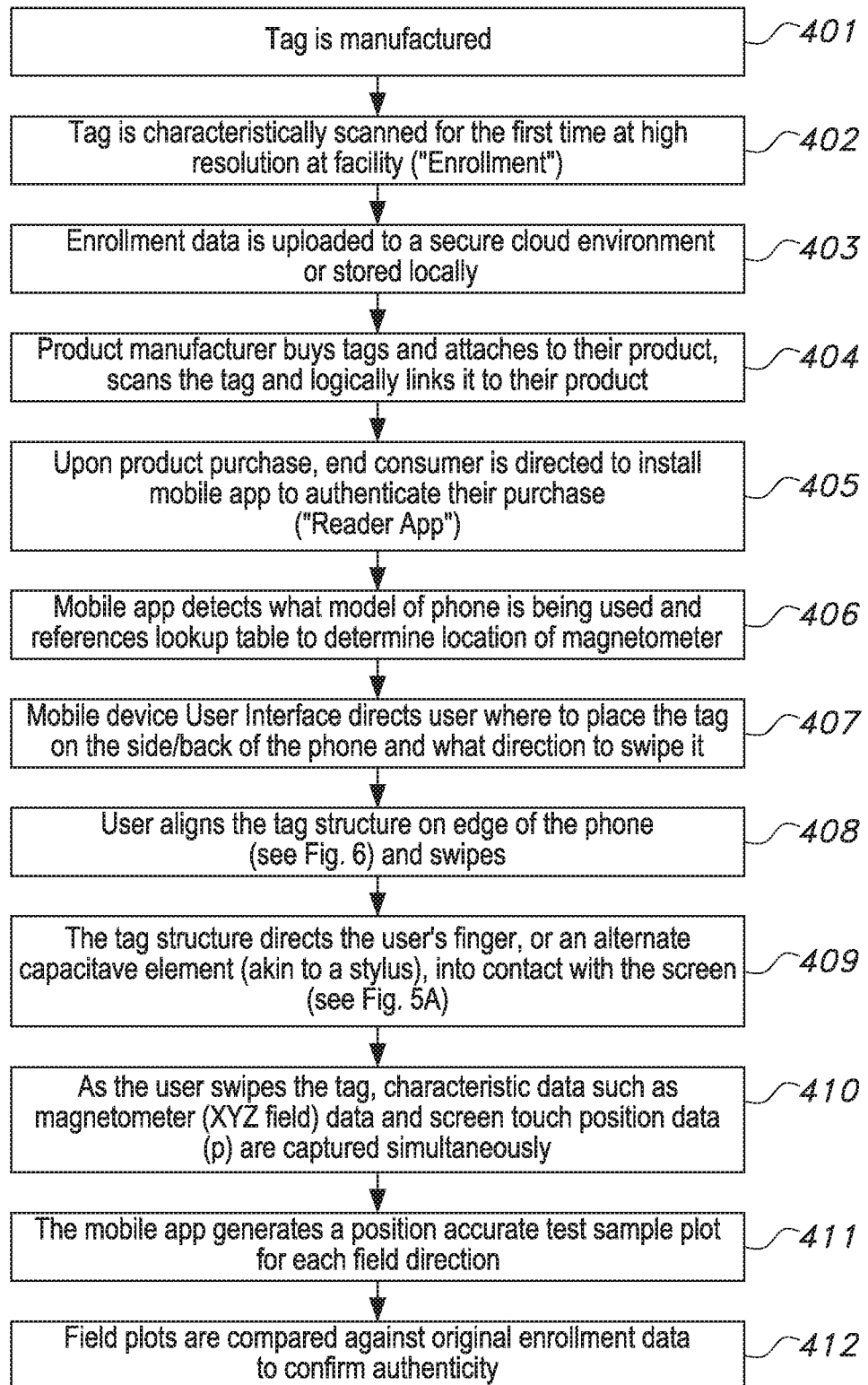
FIG. 4 is a logic flow chart for capturing the characteristic signature of a PUF tag using a smartphone or other device.
Figure 5:
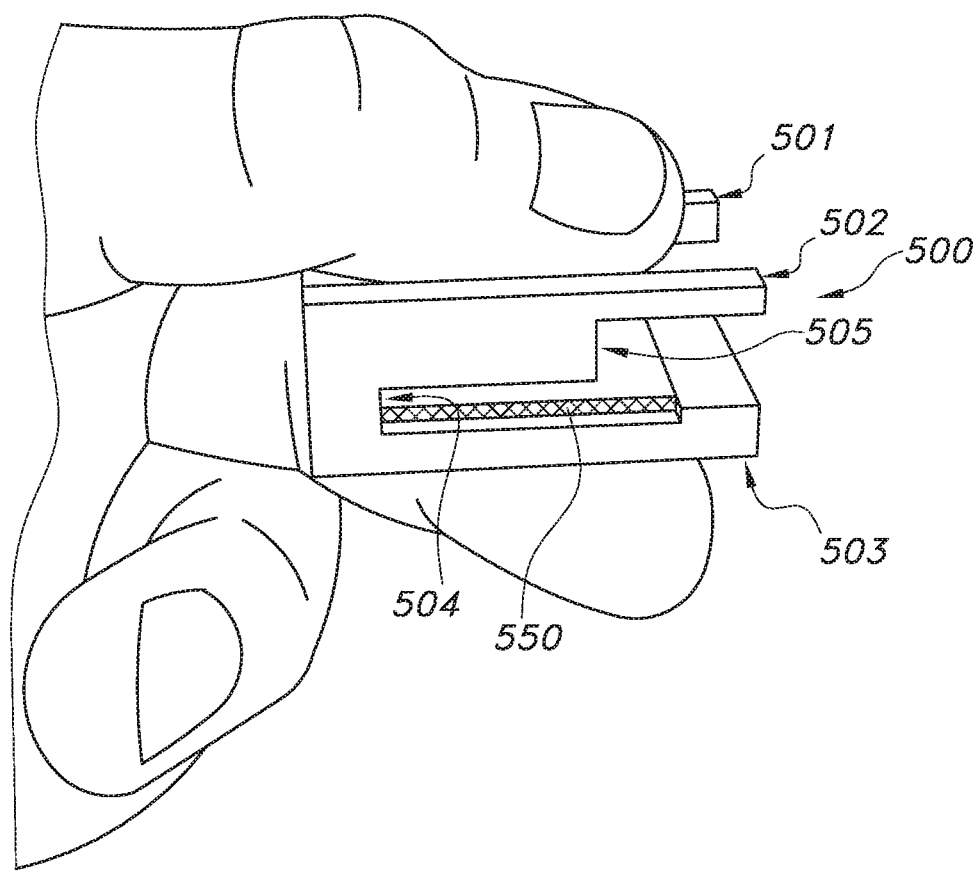
FIG. 5 is a support structure for a PUF tag.
Figure 5A:
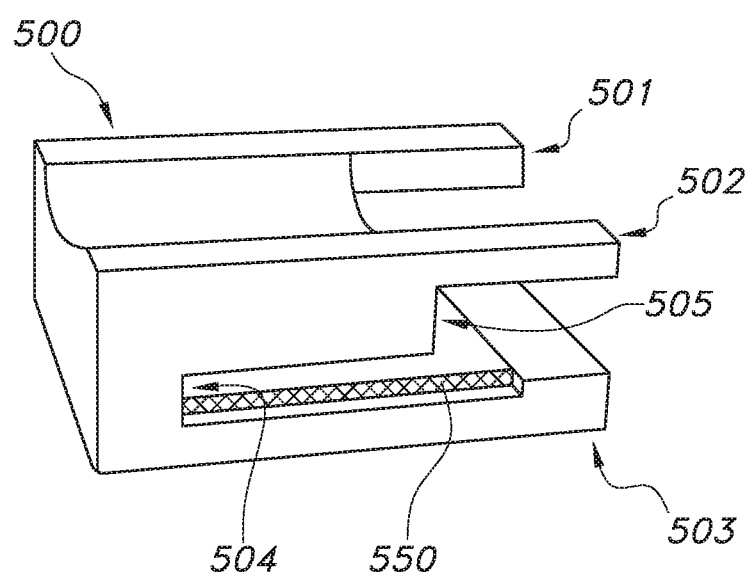
FIG. 5A is an isometric view of a support structure for a PUF tag.
Figure 5B:
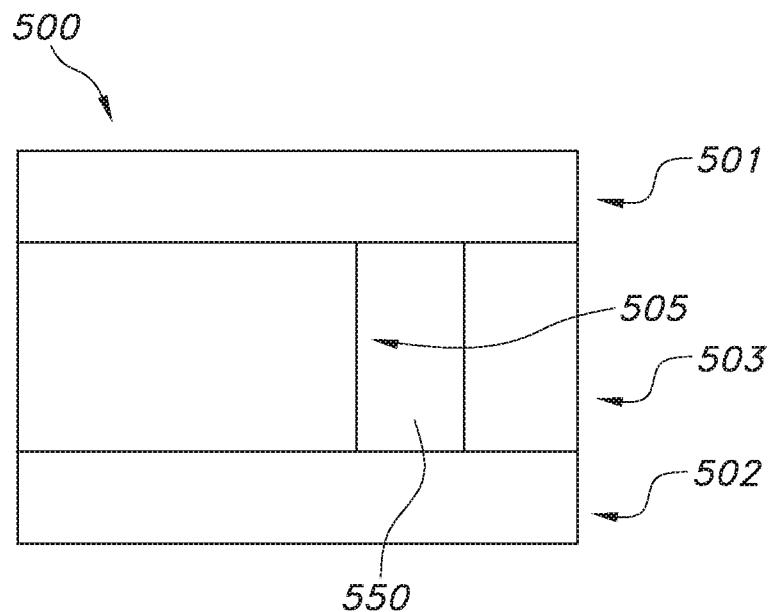
FIG. 5B is a top view of a support structure for a PUF tag.
Figure 5C:
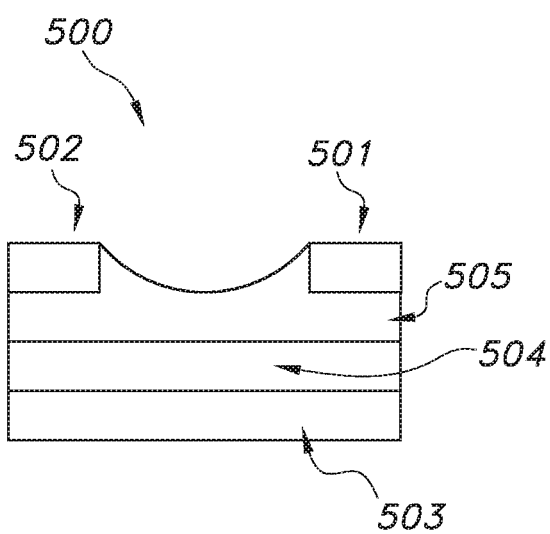
FIG. 5C is an end view of a support structure for a PUF tag.

Referring now to the drawings and particularly to FIG. 4, there is shown a logic flow chart of one sample embodiment. At 401, a physical unclonable function tag 550 is manufactured, and may be mounting on a structural element 500, see FIG. 5. At 402, the PUF tag 550 is magnetically scanned at high resolution to enroll the magnetic fingerprint information in a data base. For this purpose, at 403, the information is uploaded to a secure cloud environment for later access. The data base is not limited to a cloud environment, however, and a server or other resource may be used as well.

Figure 6:
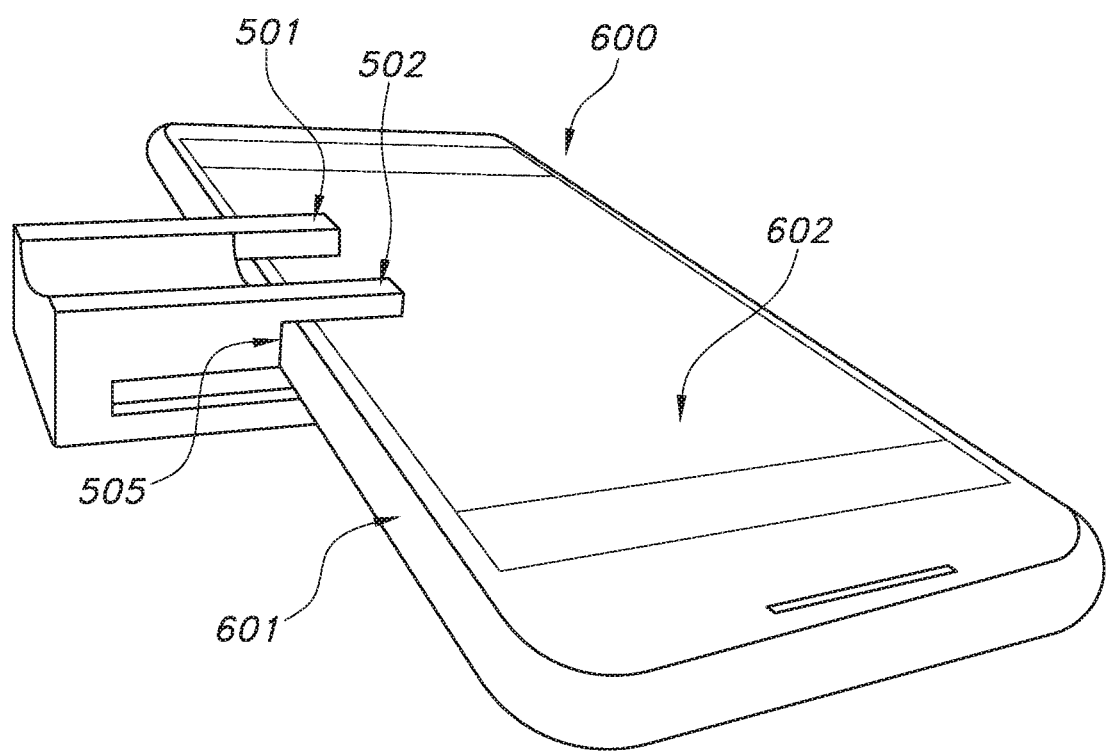
FIG. 6 is a perspective view of a support structure for a PUF tag positioned on a smartphone or other device.

At 404, a user attaches the structural element 500 with the PUF tag 550 to an item and scans the PUF tag 550 to logically link the magnetic fingerprint of the PUF tag 550 to a product. At 405, a downstream user in the chain of commerce may use a magnetic reader to identify and authenticate a given product. A user may either utilize a programmed scanning device or install a mobile smartphone application ("app") for use of a smartphone 600, see FIG. 6, as a magnetic reader.

Figure 8:
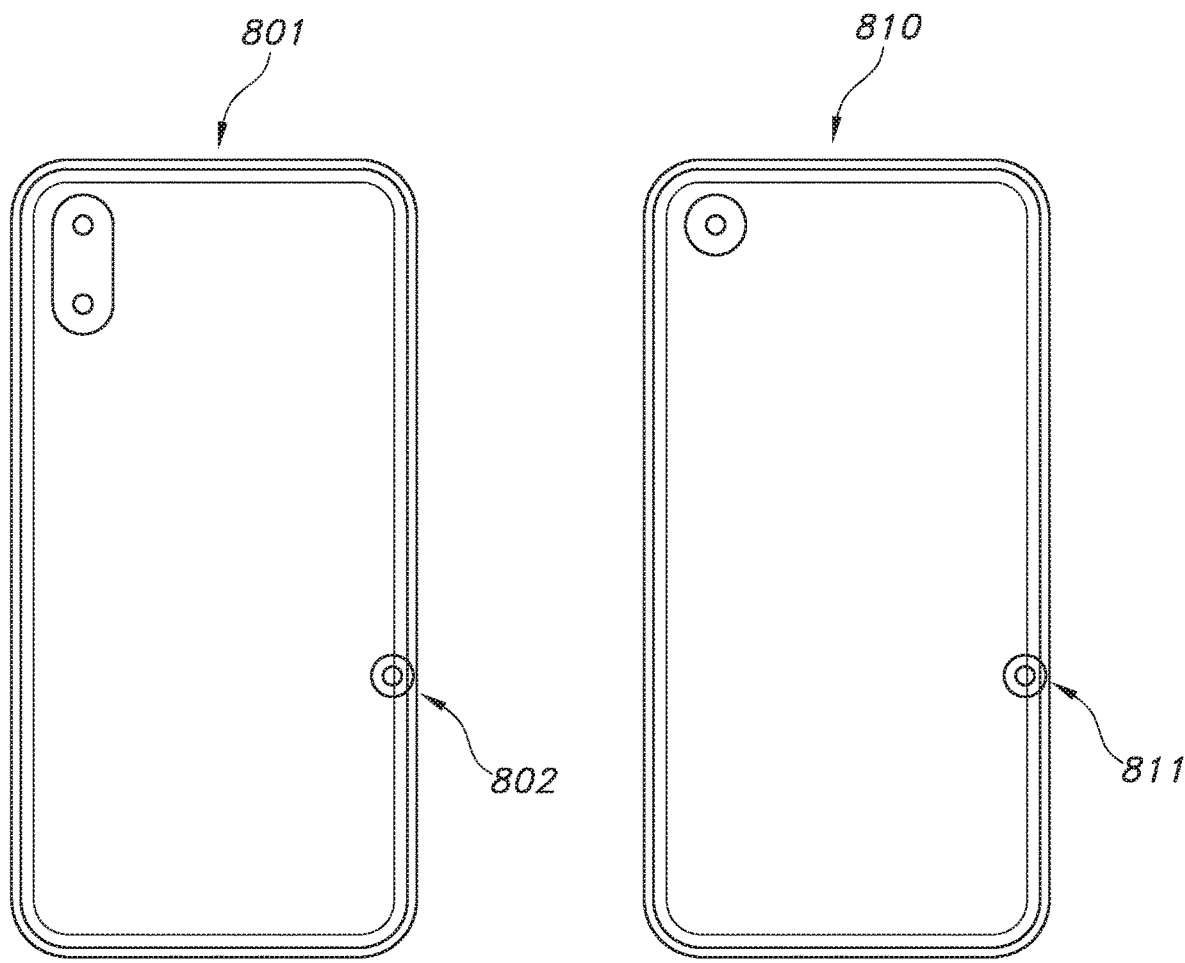
FIG. 8 shows minor differences in the magnetometer positions of two smartphone models.

At 406, the operating system of the scanning device or an application on a smartphone provides user instructions for magnetometer scan path. Different manufacturers of different smartphone models place the magnetometers in different positions. However, due to a primary use of a compass within a smartphone mobile device, the magnetometer is typically placed on an outer edge of the device. For example, two Apple® iPhone® models show slight variation in the magnetometer location (see FIG. 8, e.g., iPhone XS® and iPhone XR®). Further, another variable is the thickness of the phone and thus the difference in "depth" between the measurement element in the magnetometer and the back surface of the phone. This difference in depth will have an effect on the amplitude of the magnetic signature that is captured. For example, a smartphone with a slightly thicker piece of glass on the back surface of the smartphone would create a larger gap between the PUF tag 550 and the sensing element. This will create a lower amplitude version of the magnetic signature. The general profile in most cases will remain the same, but the peak amplitudes are smaller. Based on the knowledge of what smartphone model is performing the scan, this amplitude impact can be compensated for using a device dependent amplification algorithm.

Figure 9:
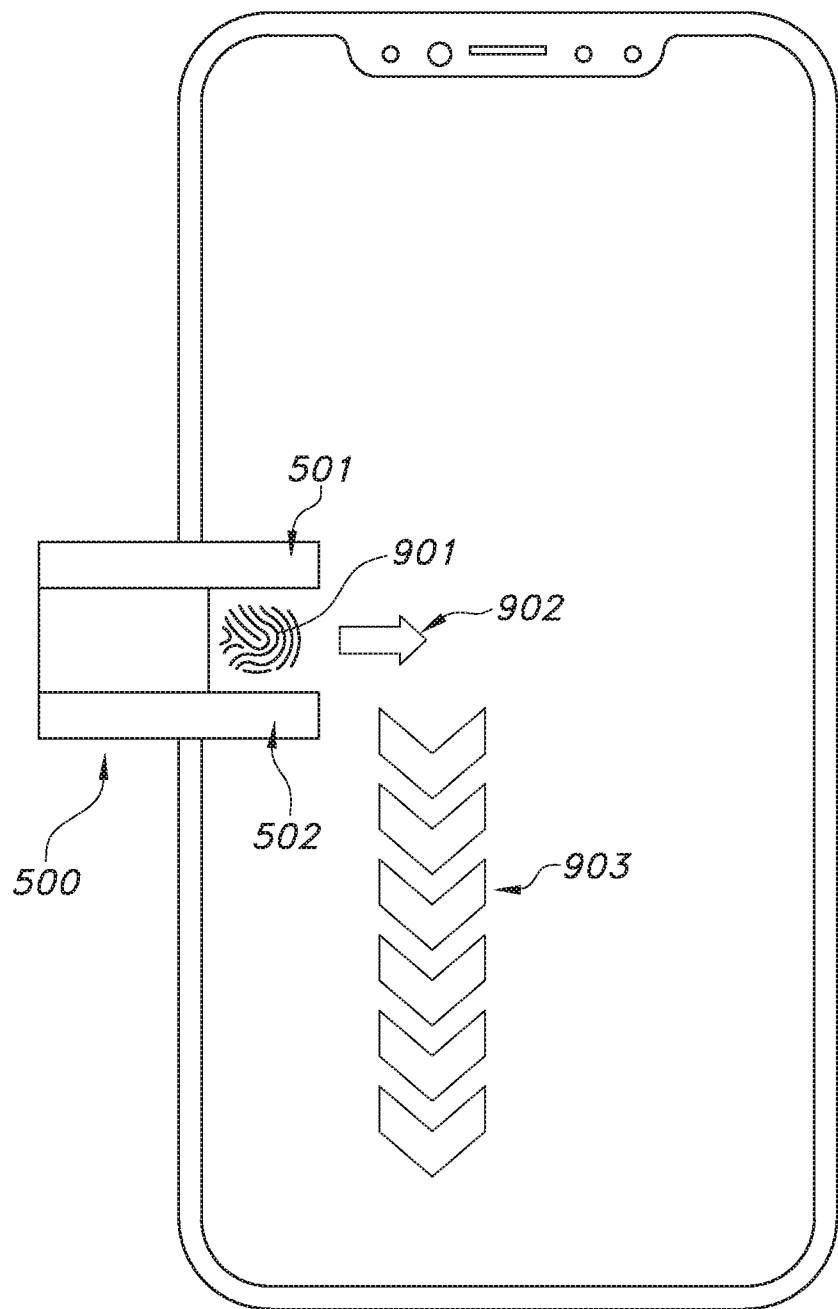
FIG. 9 shows a top view of the support structure for a PUF tag positioned on a smartphone or other device, where the operators thumb contact with the smartphone touchscreen provides a position measurement as the support structure slides to read the magnetic fingerprint of the PUF.
Figure 10:
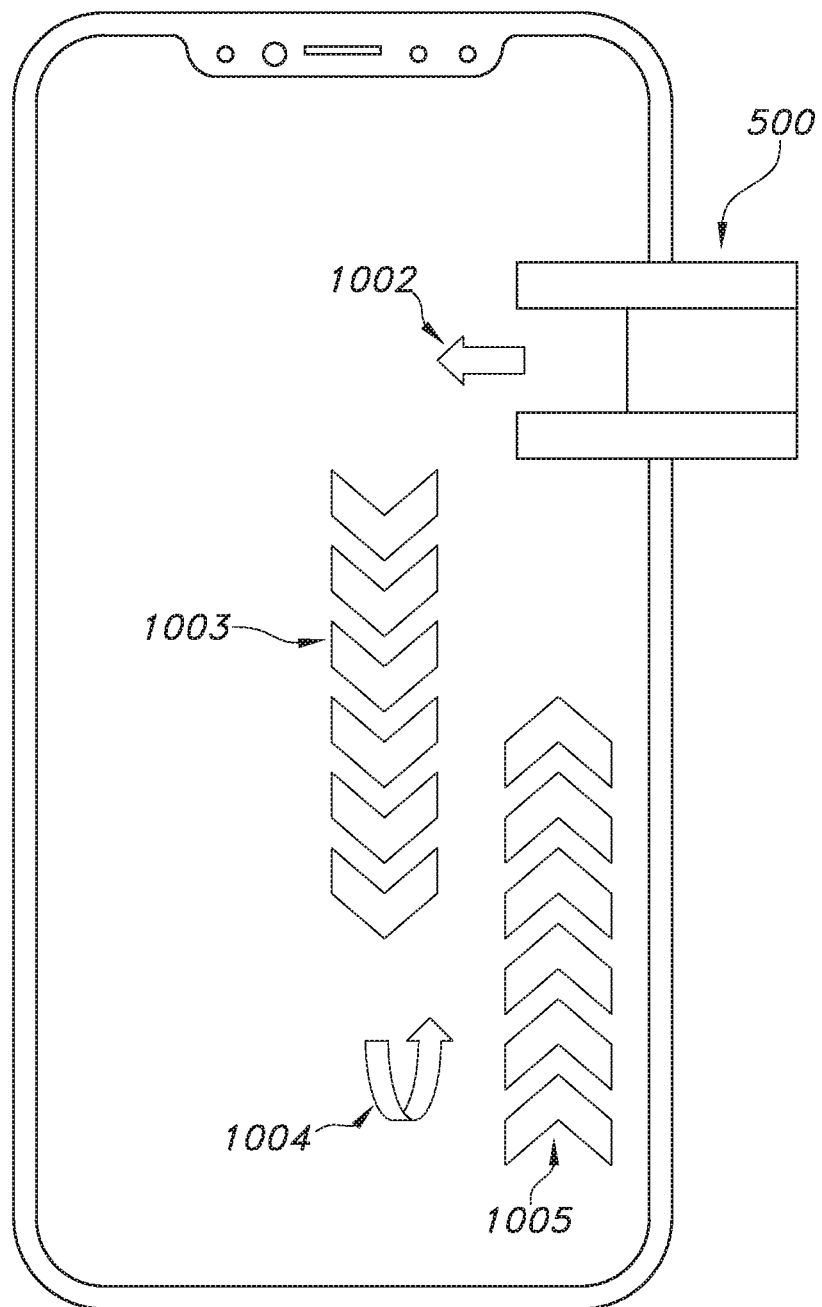
FIG. 10 shows a top view of the support structure for the PUF tag positioned on a smartphone or other device, where the operators thumb contact with the smartphone provides a position measurement as the support structure slides to read the magnetic fingerprint of the PUF and the support structure can be flipped for a second pass to read the magnetic fingerprint.

When a smartphone app is launched, it is generally able to detect the phone model, from which the app can reference a database to determine where the magnetometer is located on that given model of device. The app can then give instructions for how a user should scan their PUF tag 550 on a device. For example, on the smartphone app, the user can be directed with where to position the structural element 500 with the PUF tag 550 on the edge of the phone; what direction 903, see FIG. 9, to swipe the PUF tag 550 with respect to the smartphone 600; what speed to swipe the tag; warn the user if the PUF tag 500 swipe 903 was performed too quickly or slowly, and prompt the user to reswipe if needed, and whether to flip the tag 1004 and swipe a second surface 1005, see FIG. 10. When a PUF tag is flipped and scanned so that the magnetic surface of the PUF tag 500 is in contact with the screen side surface of the smartphone 600 the magnetic signature is uniquely different, yet still repeatably consistent. Performing a secondary scan can create another level of security and authentication for use cases requiring such.

At 408, the user aligns the structural element 500 with the PUF tag 550 on the edge of the smartphone 600. See FIG. 5. The support element 500 has base element 503 that typically rests against the bottom of the smartphone 600. The top of the support element 500 has prongs 501, 502 that may rest on the touchscreen face 602 of the smartphone 600. A gap between the prongs 501, 502 allows the users thumb to contact the touchscreen 602. The gap between the prongs may have curvature to improve the user's grip. Barrier element 505 abuts the edge of the smartphone 600 to position the PUF tag 550 with respect to the magnetometer, 802, 811, for example. Note that magnetometers 802 and 811 are not in precisely the same position. Springs or similar flexing support structures (not shown) may be used to allow smartphones of various thicknesses to be held snuggly as the PUF tag 550 is swiped along the edge of the smartphone. One or more datum surfaces can be defined so that the PUF tag 550 is swiped with positional consistency over the smartphone magnetometer. In some implementations, the datums may be spaced such that a center gap is left open and any buttons on the side of the phone can be swiped over without impacting the path of the structural element 500 with the PUF tag 550.

The PUF tag 550 is positioned on structural element 500 tag by seating the PUF tag 550 against the surface 504 of the structural element 500. Only a portion of the PUF tag 550 is read by the smartphone magnetometer because of the barrier element 505 abutting the edge of the smartphone 600. A wide enough portion of the PUF tag 550 is placed within the tag structure to allow for tolerance of swipe and also to compensate for potential distance variations in the placement of the magnetometer along the edge of the smartphone. This is typically on the order of 5-10 mm but can be varied to 0-20 mm. Precise positioning of the PUF tag 550 on the structural element 500 is not required as long as the PUF tag 550 is permanently affixed before enrolling, 402.

At 409, the tag structure, with a gap between the prongs 501, 502 directs the user's finger or thumb into contact with the smartphone screen 602. Alternatively, a capacitive element such as a stylus may be used or may be incorporated into the structural element 500. In order to take position-accurate magnetic data captures at high frequency as the tag is swiped, the "positional" location of the PUF tag 550 at each magnetic capture point must be recorded. Here, the touchscreen surface 602 is used as an input sensor. The structural element 500 is shaped in a way that encourages the user's finger to be placed on the touchscreen 602 while holding the PUF tag 550 in position on the edge of the smartphone 600. The user interface may prompt the user to hold the PUF tag 550 appropriately.

If some form of capacitive rubber material (such as what is commonly used in a device stylus) could be permanently attached to the interior of the structural element 500 in a similar location to what would have been the finger swipe region, such as on the interior ends of the prongs 501, 502. In this case the structural element 500 would ride along the surface of the touchscreen 602 and provide the positional input that could be associated to the magnetic readings during the PUF tag 550 swipe. In yet another embodiment, the capacitive touch element may have separate features. With the addition of modem under-touchscreen ultrasonic fingerprint technologies on new generations of smartphone devices, the ability to use the ultrasonic sensor to recognize the structure of the capacitive elements in contact with the surface become possible.

In the event that two capacitive rubber elements (not shown) were placed on the inner surface of the structural element 500 and then positioned on the touchscreen for scanning, the smartphone app could compute a skew factor in the event that a user did not swipe the structural element 500 along the edge of the smartphone 600 while keeping the structural element 500 barrier 504 against the smartphone 600 edge. This skew factor would be used during the magnetic signature matching algorithm.

Figure 7:
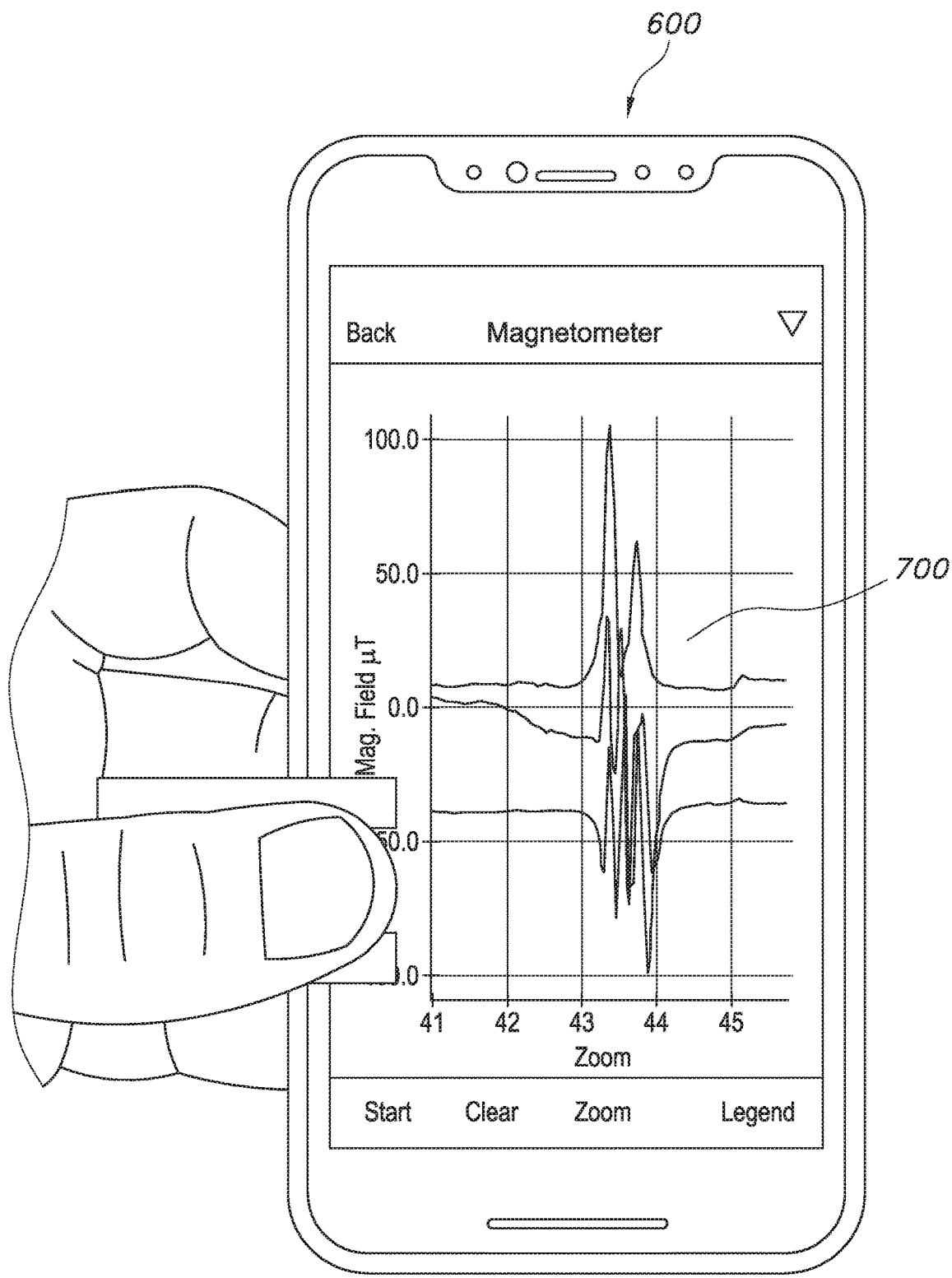
FIG. 7 is a view of measurements of the characteristic fingerprint of the PUF tag on a smartphone application.

At 410, as the user swipes the PUF tag 550, magnetometer field data BX, BY, & BZ and touchscreen position data (p) is captured simultaneously, see FIG. 7. The smarthpone app may generate an X-Y plot with the position shown on the X-axis, and corresponding magnetomer field data shown on the Y-axis.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

We claim:

1. A device for scanning the magnetic signature data of a physical unclonable function (PUF) using a smartphone comprising:
    a support structure to which a PUF tag is securely affixed that fits on an edge of the smartphone;
    a positioning structure that allows the user to hold the support structure with the PUF tag in position, while providing direct contact between a user's finger or thumb digit and a smartphone touchscreen to allow positional input data.

2. The device of claim 1, wherein the support structure has springs or similar flexing support elements that allow smartphones of various thicknesses to be held as the support structure with the PUF tag is slid along the edge of the smartphone.

3. The device of claim 1, wherein capacitive rubber elements are placed on the inner surface of the support structure such that the capacitive rubber elements are in contact with the smartphone touchscreen when the support structure is in position on the edge of the smartphone.

4. The device of claim 1, wherein the support structure has springs or similar flexing support elements that allow smartphones of various thicknesses to be held as the support structure with the PUF tag is slid along the edge of the smartphone, and capacitive rubber elements are placed on the inner surface of the support structure such that the capacitive rubber elements are in contact with the smartphone touchscreen when the support structure is in position on the edge of the smartphone.

5. The device of claim 1, wherein the support structure has curvature to accommodate the user's thumb or finger.

6. A method for capturing a magnetic signature of a physical unclonable function ("PUF") affixed to a support structure comprising:
    manufacturing a PUF tag with magnetic particles embedded in the PUF tag;
    affixing the PUF tag to the support structure;
    magnetically scanning the PUF tag to enroll a magnetic signature data;
    linking the PUF tag to a product;
    scanning the PUF tag by aligning the support structure on an edge of a smartphone, and swiping the PUF tag over a magnetometer of the smartphone to measure the magnetic signature data of the PUF tag; and
    comparing the magnetic signature data collected to that stored in thea secure cloud environment for authentication.

7. The method of claim 6, wherein a user's finger is in contact with a touchscreen of the smartphone during the scanning process to generate positional data.

8. The method of claim 6, wherein the magnetic signature data is uploaded to the secure cloud environment.

9. The method of claim 6, wherein the magnetic signature data is uploaded to a secure server.

10. The method of claim 6, wherein the support structure is flipped and a second surface is scanned.

11. The method of claim 6, wherein an application on the smartphone provides user instructions regarding the swipe direction, the speed to swipe the PUF tag, warn the user if the swipe was performed incorrectly, prompt the user to re-swipe if needed, and whether to flip the PUF tag and swipe a second surface.

* * * * *